US012718973B2

(12) United States Patent
Loray et al.

(10) Patent No.: US 12,718,973 B2
(45) Date of Patent: Aug. 25, 2026

(54) INSTALLATION AND METHOD FOR DISTRIBUTING A GASEOUS DIELECTRIC MIXTURE TO A GAS INSULATED ELECTRICAL SYSTEM

(71) Applicant: Air Liquide Electronics Systems, Paris (FR)

(72) Inventors: Frédéric Loray, Jarrie (FR); Vanina Todorova, Crolles (FR); Hervé Dulphy, Jarrie (FR)

(73) Assignee: Air Liquide Electronics Systems, Paris (FR)

( * ) Notice: Subject to any disclaimer, the term of this patent is extended or adjusted under 35 U.S.C. 154(b) by 238 days.

(21) Appl. No.: 18/722,276

(22) PCT Filed: Nov. 2, 2022

(86) PCT No.: PCT/EP2022/080519
§ 371 (c)(1),
(2) Date: Jun. 20, 2024

(87) PCT Pub. No.: WO2023/117190
PCT Pub. Date: Jun. 29, 2023

(65) Prior Publication Data
US 2026/0162854 A1 Jun. 11, 2026

(30) Foreign Application Priority Data
Dec. 20, 2021 (FR) ...................................... 2113982

(51) Int. Cl.
*H01B 17/54* (2006.01)
*F17C 7/04* (2006.01)
*H02B 7/01* (2006.01)

(52) U.S. Cl.
CPC ............... *H01B 17/54* (2013.01); *F17C 7/04* (2013.01); *H02B 7/01* (2013.01);
(Continued)

(58) Field of Classification Search
CPC .... H01B 17/54; F17C 7/04; F17C 2203/0345; F17C 2203/0358; F17C 2227/0304;
(Continued)

(56) References Cited

U.S. PATENT DOCUMENTS 3,273,348 A * 9/1966 Hart, Jr. .................. B01F 23/12 62/50.2
5,107,906 A * 4/1992 Swenson .................. F17C 9/02 141/82
(Continued)

FOREIGN PATENT DOCUMENTS

CN 204063559 U 12/2014
EP 1 014 521 6/2000
(Continued)

OTHER PUBLICATIONS

Air Liquide, Cart for gas tank: a ready-to-use autonomous storage, Dec. 7, 2021, retrieved from the internet: https://ales.airliquide.com/sites/ales/files/2021/12/07/ales_mouv_c4gt_brochure_a4_11.21_sd.pdf, 2 pgs.
(Continued)

*Primary Examiner* — Craig M Schneider
*Assistant Examiner* — Christopher D Ballman
(74) *Attorney, Agent, or Firm* — Allen E. White

(57) ABSTRACT

The invention relates to an installation for distributing a gaseous electrically insulating mixture comprising a first vessel (1) intended to contain an insulating fluid in the liquid state, first heating means (10) configured to heat the insulating fluid so that said first vessel (1) produces a gas phase of the insulating fluid, a second vessel (2) configured to produce a gas phase of a carrier fluid from the second vessel (2), a first transfer circuit (6), and second heating means (21, 22) configured to heat the gas phase of the insulating fluid.

16 Claims, 1 Drawing Sheet

(52) U.S. Cl.
CPC ................ *F17C 2203/0345* (2013.01); *F17C 2203/0358* (2013.01); *F17C 2227/0304* (2013.01); *F17C 2250/043* (2013.01); *F17C 2250/0439* (2013.01); *F17C 2250/0631* (2013.01); *F17C 2250/0636* (2013.01); *F17C 2270/05* (2013.01)

(58) Field of Classification Search
CPC ........ F17C 2250/043; F17C 2250/0439; F17C 2250/0631; F17C 2250/0636; F17C 2270/05; H02B 7/01
See application file for complete search history.

(56) References Cited

U.S. PATENT DOCUMENTS 5,394,704 A * 3/1995 Johnson ................ F17C 13/026 62/122
6,105,631 A 8/2000 Pittroff et al.
6,418,980 B1 7/2002 Larquet et al.
9,442,495 B2 * 9/2016 Van Doorn ....... H01M 8/04776
9,599,283 B2 * 3/2017 Lack ..................... F01N 3/2066
9,759,383 B2 * 9/2017 Cajiga ..................... F17C 5/007
10,770,198 B2 * 9/2020 Kieffel ................... G05D 16/20
11,174,991 B2 * 11/2021 Thor ......................... F17C 9/04
2008/0264072 A1 10/2008 Miyoshi et al.
2009/0205745 A1 * 8/2009 Farese ................... F17C 13/026 141/71
2018/0135804 A1 * 5/2018 Sieber ...................... H01B 3/56
2018/0358148 A1 12/2018 Kieffel et al.

FOREIGN PATENT DOCUMENTS

JP 2008 232226 10/2008
WO WO 2014 037031 3/2014
WO WO 2017 093259 6/2017

OTHER PUBLICATIONS

International Search Report for corresponding PCT/EP2022/080519, Jan. 20, 2023.

* cited by examiner

[Fig. 1]
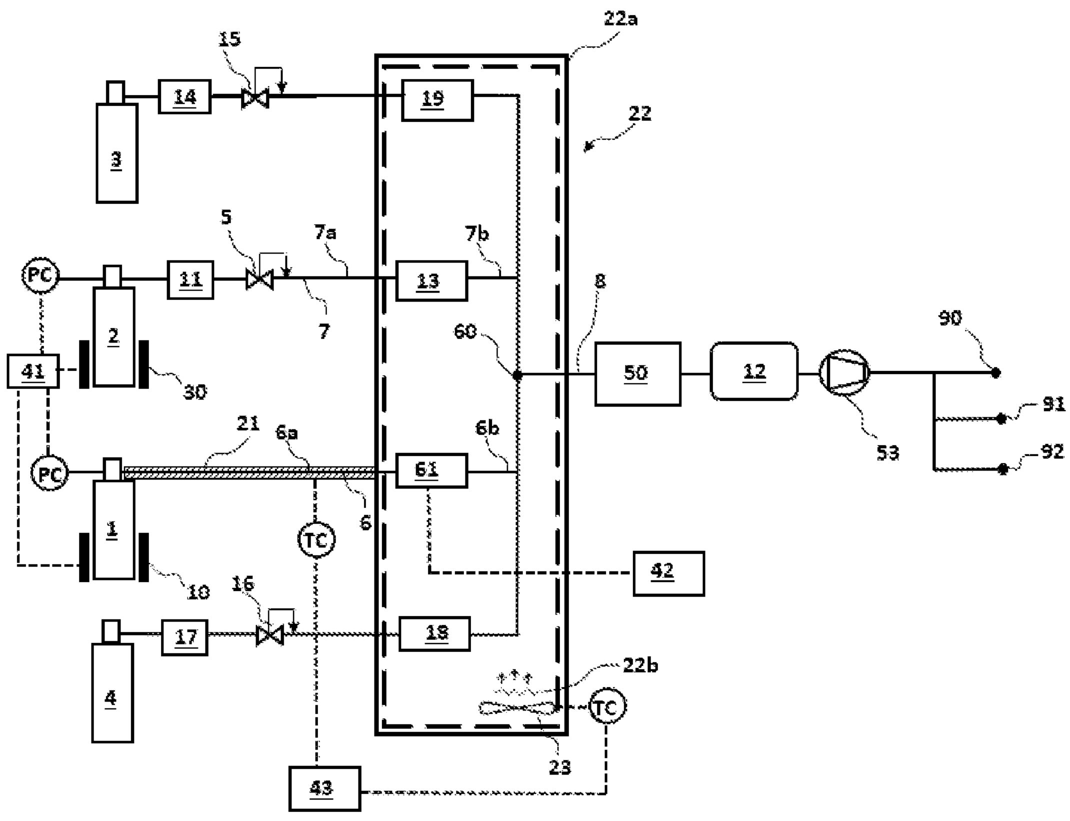
[Fig. 2]
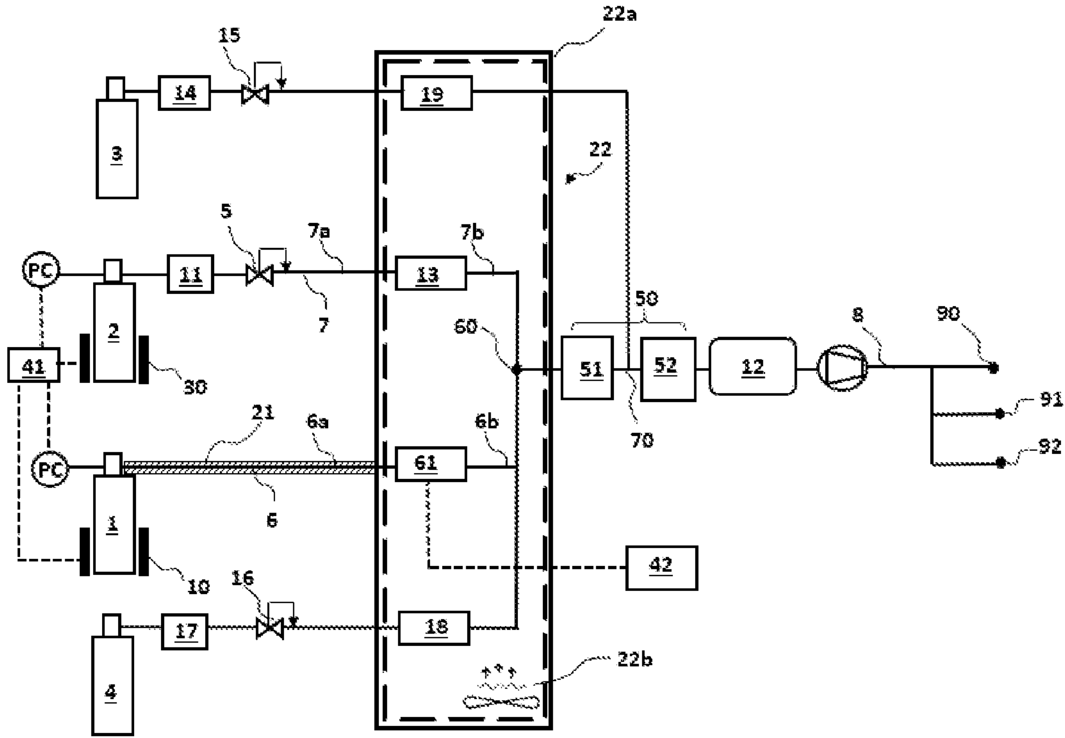

INSTALLATION AND METHOD FOR DISTRIBUTING A GASEOUS DIELECTRIC MIXTURE TO A GAS INSULATED ELECTRICAL SYSTEM

CROSS REFERENCE TO RELATED APPLICATIONS

This application is a 371 of International Application No. PCT/EP2022/080519, filed Nov. 2, 2022, which claims priority to French Patent Application No. 2113982, filed Dec. 20, 2021, the entire contents of which are incorporated herein by reference.

BACKGROUND

The present invention relates to an installation for distributing a gaseous dielectric mixture intended to be used in a gas insulated electrical system, in particular a high-voltage system. The installation makes it possible to manufacture the gaseous dielectric mixture at the site of use and to distribute the mixture thus manufactured directly to the system in order to perform electrical insulation functions therein. The invention also relates to a method for distributing a mixture implementing such an installation.

In particular, an installation and a method according to the invention are intended to distribute mixtures comprising at least one insulating fluid such as a perfluoroketone or a perfluoronitrile and at least one carrier gas such as carbon dioxide ($CO_2$), nitrogen ($N_2$), oxygen ($O_2$), air or synthetic air. Note that the insulating fluid is referred to as such owing to its high dielectric strength and breaking power, said at least one carrier gas also possibly having electrical insulation properties.

The term electrical system designates, in this application, both equipment constituting distribution substations and electrical power transmission lines.

Known gas insulated distribution substations include in particular Gas Insulated Switchgear (GIS).

Gas insulated high-voltage lines are known in English as Gas Insulated Lines (GIL) for welded assemblies or Gas Insulated Busducts (GIB) for bolted assemblies.

Note that the invention may also be applied to any type of electrical equipment insulated under gas pressure, that is to say comprising a closed casing containing gas, in particular circuit breakers, disconnectors, current transformers, voltage transformers, etc., as well as to equipment combining all or some of the aforementioned devices.

Note that the term "high voltage" covers the former name "medium voltage" (or high voltage A) referring to a voltage of greater than 1000 volts in alternating current and greater than 1500 volts in direct current, and the former name "high voltage" (or high voltage B) referring to a voltage of greater than 50,000 volts in alternating current and greater than 75,000 volts.

One of the main technologies for insulating electrical systems is insulation using a dielectric gas or gas mixture confined under pressure around live parts and elements. This insulating gas or gas mixture also makes it possible to perform the function of extinguishing the arc resulting from electrical interruption.

Currently, the gas most often used in this type of equipment is sulfur hexafluoride ($SF_6$). This gas has a relatively high dielectric strength, good thermal conductivity and low dielectric losses. It is chemically inert and non-toxic to humans and animals and, after being dissociated by an electric arc, it recombines rapidly and almost completely. In addition, it is non-flammable and can still be obtained at a moderate price. However, $SF_6$ has the major disadvantage of having a global warming potential (GWP) which is 24,000 times higher than that of $CO_2$ and a residence time in the atmosphere of 3,200 years, which makes it one of the most potent greenhouse gases. $SF_6$ was therefore included by the Kyoto Protocol (1997) on the list of gases whose emissions must be limited.

The best way to limit $SF_6$ emissions is to limit the use of this gas, which has led industry to look for alternatives to $SF_6$. "Simple" gases such as air or nitrogen, which have no negative impact on the environment, have a much lower dielectric strength than $SF_6$. Thus, for example, the dielectric strength at alternating voltage (50 Hz) of air and nitrogen are substantially three times lower than that of $SF_6$.

Therefore, the use of these simple gases for electrical insulation and/or extinguishing electric arcs in electrical equipment involves drastically increasing the volume and/or filling pressure of this equipment, which goes against the efforts that have been made over recent decades to develop compact equipment which is safe for personnel, with increasingly small dimensions.

Industry has therefore looked for alternatives offering the same insulation and arc breaking properties as $SF_6$. To this end, new substitute gas mixtures with a reduced environmental impact have been developed. These gas mixtures are based on at least one insulating gas selected from a perfluoroketone with five carbon atoms or a perfluoronitrile with four carbon atoms, mixed with a carrier gas or dilution gas with a very low GWP, such as $CO_2$ which has a GWP equal to 1, or with a zero GWP, such as nitrogen or air.

The composition of these new gas mixtures varies depending on the functionalities of the equipment to be filled, in particular depending on the voltage level of the equipment or its electrical functionalities. The content of each component in the mixture may also vary. It is therefore necessary to be able to fill the equipment with the appropriate mixture.

When it comes to filling electrical equipment, one solution is to prepare the mixtures at dedicated packaging centers, package them in storage vessels such as cylinders or containers and deliver the vessels to the site of use. The equipment is filled from the vessel.

This solution presents a number of problems. Gaseous dielectric mixtures are packaged in liquefied form and require homogenization. To be specific, the liquefied mixture is composed of two phases, liquid and gas, in equilibrium with one another. The different physical properties of the components of the mixture, in particular boiling points and saturated vapor pressures, make the mixture inherently heterogeneous within the storage vessel. Moreover, when the mixture is drawn off in the gas or liquid phase there is an alteration of the respective proportions of the constituents of the mixture.

Furthermore, the use of vessels results in limited autonomy with an interruption in distribution that is detrimental to the efficiency of operations. Since the lead times of the gas mixtures may be relatively long, the user must manage their stock of cylinders in order to ensure continuity of their operations. Different types of mixtures may be required, which further complicates logistics. The operations of connecting/disconnecting the cylinders are also tedious and increase the risk of contaminating the gas mixture with ambient air.

Another problem concerns precision in the production of the mixture, which may not be sufficient. Added to the uncertainty regarding the concentration values of the mixture produced are the differences in manufacture that may exist between different cylinders. Such differences may cause the results produced by the consuming unit to vary substantially on each cylinder change. Moreover, the composition of the mixture prepared in advance is likely to be altered, in particular by leaks from the gas phase or the liquid phase.

Another solution is to prepare the gaseous dielectric mixture at the site of use. The production method based on flow rate control is known in particular. This method involves taking the components of the mixture from separate vessels and sending them to a gas mixer. The content of each component is controlled by adjusting their respective flow rates to the mixer. However, precision as regards the mixture obtained is limited. To be specific, flow regulators are sensitive to ambient temperature, which limits their use outdoors. Flow regulators are also sensitive to the temperature of the gas that they are regulating and they need to be supplied with pure gas at a stable pressure for optimal stability. Furthermore, some insulating fluids, such as perfluoroketone, are in the liquid state and cannot be drawn off in the gas phase at atmospheric pressure. One solution is to pressurize the vessel with nitrogen or $CO_2$ to draw off the liquid phase, then vaporize the liquid phase. In addition to the complexity and constraints imposed by this solution, there is a diffusion of nitrogen or $CO_2$ in the liquid phase, which affects the operation and precision of the flow regulators.

The invention aims to overcome all or some of the drawbacks mentioned above, in particular by proposing an installation for distributing a gaseous dielectric mixture suitable for the gas insulation of electrical equipment, which makes it possible to precisely control the composition of the mixture, which offers continuity and flexibility of distribution, in particular in terms of composition and contents of the components in the gas mixture, and which makes it possible to distribute a mixture with a stable composition and with a sufficient flow rate for use on an industrial scale.

SUMMARY

To this end, the solution of the invention is an installation for distributing an electrically insulating gas mixture to a gas insulated electrical system, in particular a high-voltage electrical system, said installation comprising:

- a first vessel intended to contain an insulating fluid in the liquid or liquefied state,
- first heating means configured to heat the insulating fluid in the first vessel such that said first vessel produces, at a first outlet, a gas phase of the insulating fluid,
- a second vessel intended to contain a carrier fluid and configured to produce a gas phase of the carrier fluid at a second outlet of the second vessel,
- a first transfer circuit configured to transfer the gas phase of the insulating fluid from the first outlet of the first vessel to a combination point, the first transfer circuit comprising a first upstream part connected to the first vessel and a first downstream part connected on the one hand to the first upstream part and on the other hand to the combination point,
- a second transfer circuit configured to transfer the gas phase of the carrier fluid from the second outlet of the second vessel to the combination point,
- a distribution circuit fluidically connected to the combination point and configured to distribute an electrically insulating gas mixture comprising the gas phase of the insulating fluid and the gas phase of the carrier fluid to the high-voltage electrical equipment, the first downstream part of the first transfer circuit comprising a first flow regulator device configured to regulate and/or adjust the gas phase flow rate of the insulating fluid flowing toward the combination point, said installation further comprising second heating means configured to heat the gas phase of the insulating fluid at least at the combination point and in the downstream part of the first transfer circuit.

Depending on the case, the invention may comprise one or more of the features mentioned below.

The second heating means are further configured to heat the gas phase of the insulating fluid in at least a portion of the first upstream part of the first transfer circuit.

The first upstream part of the transfer circuit comprises at least one fluid pipe, the second heating means comprising a first heating device arranged around all or part of said fluid pipe, in particular the first heating device is of resistive or inductive type.

The second heating means comprise a second heating device arranged around the combination point and the first downstream part of the first transfer circuit.

The second heating device comprises a thermally insulating casing defining an internal volume in which the downstream part of the first transfer circuit, the first flow regulator device, and the combination point are arranged, and a heating member adapted to heat said internal volume, in particular the heating member is of resistive type.

The thermally insulating casing comprises at least one layer of a flexible material, in particular the flexible material comprises at least one woven fabric of threads formed of a thermally insulating material or a non-woven of fibers formed of a thermally insulating material.

The thermally insulating casing is made up of several panels connected together by removable attachment means.

The second transfer circuit comprises a second upstream part connected to the second vessel and a second downstream part connected to the combination point, said second downstream part comprising a second flow regulator device configured to regulate and/or adjust the gas phase flow rate of the carrier fluid flowing toward the combination point, the second heating device preferably being configured to heat the second downstream part of the second transfer circuit.

The installation further comprises at least one additional vessel intended to contain an additional carrier fluid and configured to produce a gas phase of said additional carrier fluid at an outlet of the additional vessel, the installation comprising an additional transfer circuit configured to transfer the gas phase of the additional carrier fluid from the outlet of the additional vessel to the combination point, the additional transfer circuit comprising an additional upstream part connected to the additional vessel and an additional downstream part connected to the combination point, said additional downstream part comprising an additional flow regulator device configured to regulate and/or adjust the gas phase flow rate of the additional carrier fluid flowing toward the combination point, the second heating device preferably being configured to heat the additional downstream part of the additional transfer circuit.

The first heating means are configured to heat the liquefied insulating fluid in the first vessel to a first temperature, the second heating means being configured to heat the vapor phase of the liquefied insulating fluid to a second temperature higher than the first temperature at least at the combination point and in all or part of the first transfer circuit.

The first heating means are configured to deliver a variable heating power, the installation comprising at least one pressure sensor configured to measure the pressure prevailing inside the first vessel and a first control unit connected to the pressure sensor and to the first heating means, the first control unit being configured to vary the heating power delivered by the first heating means as a function of the pressure measured by the pressure sensor.

The first heating means are configured to deliver a variable heating power, the installation comprising at least one temperature measurement member configured to measure the temperature of the first vessel and a first control unit connected to the temperature measurement member and to the first heating means, the first control unit being configured to vary the heating power delivered by the first heating means as a function of the temperature measured by the temperature measurement member.

The second vessel is intended to contain the carrier fluid in liquefied form, the installation comprising third heating means configured to heat the liquefied carrier fluid in the second vessel in such a way as to vaporize at least part of the liquefied carrier fluid and to distribute a gas phase of the carrier fluid in the second transfer circuit.

The second transfer circuit comprises an expansion member configured to reduce the pressure of the gas phase of the carrier fluid, a heater arranged upstream of the expansion member so as to heat the gas phase before its expansion by the expansion member.

The distribution circuit comprises at least one of the following: a mixing device configured to mix the gas phase of the insulating fluid and the gas phase of the carrier fluid, a pressure-raising member arranged downstream of the mixing device, a buffer tank arranged upstream of the pressure-raising member.

According to another aspect, the invention relates to a method for distributing an electrically insulating gas mixture to a high-voltage electrical system, said method comprising the following steps:

a) heating an insulating fluid in the liquid or liquefied state in a first vessel by first heating means so as to vaporize at least part of the liquefied insulating fluid and to produce a gas phase of the insulating fluid in the first vessel,
b) passing the gas phase of the insulating fluid through a first transfer circuit so as to transfer the gas phase of the insulating fluid from the first vessel to a combination point, the first transfer circuit comprising a first upstream part connected to the first vessel and a first downstream part connected on the one hand to the first upstream part and on the other hand to the combination point,
c) passing a gas phase of a carrier fluid from a second vessel through a second transfer circuit so as to transfer the gas phase of the carrier fluid to the combination point,
d) combining the gas phase of the insulating fluid and the gas phase of the carrier fluid at the combination point and passing the gas phase of the insulating fluid and the gas phase of the carrier fluid combined through a distribution circuit adapted to distribute to the high-voltage electrical system an electrically insulating gas mixture comprising the gas phase of the insulating fluid and the gas phase of the carrier fluid,
e) regulating and/or adjusting the gas phase flow rate of the insulating fluid flowing toward the combination point by means of a first flow regulator device arranged on the first downstream part of the first transfer circuit,
f) heating the gas phase of the insulating fluid at least at the combination point and in the downstream part of the first transfer circuit by second heating means.

BRIEF DESCRIPTION OF THE DRAWINGS

The invention will now be better understood from the following detailed description, which is provided by way of non-limiting illustration, with reference to the appended figures described below.

FIG. 1 schematically depicts an installation according to an embodiment of the invention.

FIG. 2 schematically depicts an installation according to another embodiment of the invention.

DETAILED DESCRIPTION OF PREFERRED EMBODIMENTS

FIG. 1 depicts an installation comprising a first vessel 1 of insulating fluid and a second vessel 2 of carrier fluid. The fluids are of different nature. They are preferably pure, simple or compound bodies. Each of the vessels may be a cylinder, typically a cylinder that may have a water volume of up to 50 L, or a set of cylinders connected to one another to form a bundle of cylinders or a tank of greater capacity, in particular a capacity of up to 1000 L, such as a cryogenic storage tank or a tank arranged on a lorry trailer.

The installation according to the invention is suitable for producing gaseous dielectric mixtures with at least two components. Of course, the installation may comprise more than two vessels and produce mixtures containing more than two constituents, in particular ternary or quaternary gas mixtures. Thus, FIG. 1 depicts the case where the installation is configured to produce a gas mixture with four constituents, from the first and second vessels 1, 2 and optionally two additional vessels 3, 4. In particular, the vessels 3, 4 are adapted to contain optional additional carrier fluids and configured to produce gas phases of said additional carrier fluids at their respective outlets.

In the context of the invention, distribution includes the preparation, i.e. the manufacture of the mixture and conveying it to the equipment.

A first transfer circuit 6 is fluidically connected on the one hand to a first opening of the first vessel 1 and on the other hand to a combination point 60. A second transfer circuit 7 is fluidically connected on the one hand to a second opening of the second vessel 2 and on the other hand to the combination point 60. Additional transfer circuits may be provided for each of the additional vessels 3, 4, where applicable.

The first transfer circuit 6 comprises a first upstream part **6*a* connected to the first vessel 1 and a first downstream part 6*b* connected on the one hand to the first upstream part 6*a* and on the other hand to the combination point 60. The second transfer circuit 7 comprises a second upstream part 7*a* connected to the second vessel 2 and a second downstream part 7*b* connected to the combination point 60**.

The downstream part of the first transfer circuit 6 comprises a first flow regulator device 61 configured to regulate and/or adjust the flow rate of insulating fluid flowing toward the combination point 60 according to a first flow setpoint D1. The first setpoint D1 may be determined as a function of a target content C1 of insulating fluid in the mixture.

"Insulating fluid" means a fluid with high insulating power, that is to say having sufficient electrical insulation and electric arc extinguishing capacities to be used for the gas insulation of a high-voltage electrical system.

As insulating fluid, it is possible in particular to use a fluid containing at least one fluoroketone and/or at least one perfluoronitrile. In particular, the insulating fluid may be selected from the dielectric fluids in the Novec™ range marketed by 3M, for example the insulating fluid with the trade name 3M™ Novec™ 4710 (hereinafter referred to as C4-FN) and the insulating fluid with the trade name 3M™ Novec™ 5110 (hereinafter referred to as C5-FK). Preferably, the insulating fluid is the minority component in the gas mixture distributed.

"Carrier fluid" means a gas suitable for diluting the insulating fluid so as to make the overall properties of the mixture suitable for the final use. The gas mixture may contain at least one carrier fluid selected from carbon dioxide ($CO_2$), nitrogen ($N_2$), oxygen ($O_2$), air or synthetic air. Note that the carrier fluid may itself also have electrical insulation properties. Preferably, the gas mixture contains at least $CO_2$ as carrier fluid. At least one carrier gas may thus perform a dilution function and/or be an active gas, for example perform a function of superoxygenation of the gaseous atmosphere insulating the equipment. In particular, oxygen may be used to counterbalance the effects of arc breaking which result in decomposition of $CO_2$.

In the context of the invention, the insulating fluid is stored in the liquid state or in the form of liquefied gas in the first vessel 1. In particular, an insulating fluid of C4-FN type is a liquefied gas. An insulating fluid of C5-FK type is a liquid.

The installation comprises first heating means 10 configured to heat the liquefied insulating fluid in the first vessel 1.

This makes it possible to heat at least a part of the insulating fluid in the vessel 1 and to increase the saturated vapor pressure of the insulating fluid. To be specific, the saturated vapor pressures of the insulating fluids are relatively low at ambient temperature, for example 2.5 barA at 20° C. for C4-FN and 0.8 barA at 20° C. for C5-FK. Heating the first vessel 1 increases the quantity of insulating fluid that can be vaporized in the vessel 1 and therefore the gas phase flow rate that can be distributed from the vessel 1.

Moreover, the liquefied fluid is composed of two phases, liquid and gas, in equilibrium with one another. When the gas phase is drawn off from a vessel of liquefied gas, part of the liquid must be vaporized so as to regenerate the gas phase as it is used up in order to maintain the equilibrium in the vessel. The liquid therefore begins to cool owing to the energy used to go from one phase to the other.

Heating the vessel 1 makes it possible to compensate for the energy used for vaporization of the insulating fluid, particularly in the case of perfluoronitrile as insulating fluid, and if necessary also to maintain a saturated vapor pressure higher than at ambient temperature, particularly in the case of perfluoroketone as insulating fluid. As a result, the gas phase is maintained at a stable temperature, flow rate and pressure.

Preferably, the first heating means 10 are external to the vessels. In one embodiment, the heating means 10 are arranged around all or part of the vessel 1 and extend over all or some of the height of the vessel 1, preferably at least at the lower part of the vessels.

The first heating means may be configured to heat at least part of the outer surface of the vessel 1. Transfer of heat to the liquid phase takes place between the heated surface and the liquid phase of the insulating fluid. It is also conceivable for the first heating means 10 to be internal to the vessel. Note that the first heating means may be configured to heat the surface of the first vessel 1 to temperatures ranging from 15 to 65° C., preferably from 50 to 55° C. for perfluoroketone and preferably from 20 to 35° C. for perfluoronitrile.

The first heating means 10 may be in the form of at least one heating belt, a heating cord or a shell for circulation of heat transfer fluid. Depending on the case, the first heating means 10 may be of inductive or resistive type. For example, the body of the vessel 1 may be heated with the aid of at least one resistive conducting element in which the passage of an electrical current produces heat.

According to an advantageous possibility, the first heating means 10 comprise magnetic induction means capable of creating a magnetic field in at least a part of the casing of the vessel 1 and of heating the material of the vessel 1 by virtue of the induced electrical current. The use of first heating means of inductive type makes it possible to avoid the transfer of energy by conduction since the currents induced by the inductor directly heat the material of the cylinder in its thickness. This improves energy transfers and leads to higher distribution flow rates.

The carrier fluid may be stored in the second vessel 2 in the liquid state or in the form of liquefied gas. Preferably, the carrier fluid is a liquefied gas, in particular $CO_2$.

In this case, as shown in FIG. 1, the installation comprises third heating means 30 configured to heat the liquefied or liquid carrier fluid in the second vessel 2 in such a way as to vaporize at least part of the liquefied carrier fluid and to distribute a gas phase of the carrier fluid in the second transfer circuit 7. This makes it possible to supply the necessary energy to the second vessel to compensate for the loss of energy upon evaporation of the carrier fluid and to ensure a sufficient and stable distribution flow rate. Preferably, the third heating means 30 are of inductive type, in particular of the same type as the first heating means 10. Note that the third heating means may be configured to heat the surface of the second vessel 2 to temperatures ranging from 15 to 65° C., from 50 to 55° C. for perfluoroketone and preferably from 20 to 35° C. for perfluoronitrile.

In the case where the carrier fluid is stored in the gaseous state, it is not necessary to provide means for heating the vessel. This applies to the second vessel of carrier fluid, as well as to other vessels of carrier fluid in the installation, where applicable. Thus, FIG. 1 schematically depicts an installation comprising additional vessels 3, 4 containing additional carrier fluids. In particular, the additional carrier fluids may be oxygen and nitrogen stored in the gaseous state in their respective vessels.

As can be seen in FIG. 1, the gas phases of the insulating fluid and the carrier gas are conveyed by their respective transfer circuit 6, 7 to a combination point 60 at which the phases are combined. The combined phases then flow into a distribution circuit 8 adapted to distribute to the high-voltage electrical system an electrically insulating gas mixture comprising the gas phase of the insulating fluid and the gas phase of the carrier gas. The electrical system may be connected to a distribution point 90 for filling.

One problem concerns controlling the temperature of the vaporized insulating fluid. Specifically, the gas phase of the insulating fluid has to be kept at a temperature greater than or equal to the vaporization temperature over the entire path from the vessel to the point of use. The presence of colder spots on the path of the fluid downstream of the vessel may result in condensation of the gas phase at these spots. These condensates in suspension in the gas phase lead to the malfunction of the flow rate controllers and to instability of the flow rate and therefore of the concentration of insulating fluid.

To remedy this, the installation further comprises second heating means 21, 22 configured to heat the gas phase of the insulating fluid at least at the combination point 60 and in the downstream part 6*b* of the first transfer circuit 6.

The invention thus allows more effective control of the temperature of the insulating fluid. The gas phase of the insulating fluid can be kept at a temperature greater than or equal to the vaporization temperature at the combination point 60 and in the downstream part 6*b*. It is important to heat the insulating fluid up to the combination point 60 where it combines with the carrier fluid since it is when the insulating fluid is in the pure state that the risk of condensation is highest. Once diluted in the carrier fluid, the risk of condensation is eliminated because its partial pressure will be significantly lower than it was in the pure state, and therefore lower than its saturated vapor pressure for the temperature in question.

By virtue of the invention, the insulating fluid is heated in the downstream part, which comprises the first flow regulator device, in order to avoid condensation of the gas phase. This prevents the risk of blockage or modification of the fluid passage cross section in this region, which would be detrimental to the precision of the mixture produced. Furthermore, the second heating device makes it possible to control the temperature of the first regulator device, which makes it possible to remain unaffected by temperature variations in the external environment. The operating conditions of the flow regulator are stable, which ensures better precision and stability of the concentration of the insulating fluid in the mixture, even in on-site use. The simultaneous heating of the fluid at the combination point prevents the appearance of cold spots on the first transfer circuit 6 until the gas phase of the insulating fluid is combined with the gas phase of the carrier fluid.

Another advantage of the invention is that instead of drawing off the insulating fluid in the liquid state then vaporizing same as in prior art installations, in this installation the insulating fluid is drawn off in the gas phase. To this end, the first vessel 1 is heated, to increase its internal pressure instead of being pressurized by a secondary fluid. This makes it possible to maintain the purity of the fluid, and therefore the precision of the flow rate and the final concentration.

Preferably, the second heating means 21, 22 are further configured to heat the gas phase of the insulating fluid in at least a portion of the first upstream part 6*a* of the first transfer circuit 6. This makes it possible to heat the gas phase over most, if not all of its path toward the combination point and to further minimize the risk of recondensation of the vapor phase downstream of the first vessel 1.

Preferably, the first upstream part 6*a* comprises at least one fluid pipe 6*a* connected to the first opening of the first vessel 1. The second heating means 21, 22 comprise a first heating device 21 arranged around all or part of said fluid pipe 6*a*. Preferably, the first heating device 21 is of resistive or inductive type. The first heating device may be in the form of a heating tube or sleeve. The first heating device may for example be an electrical resistor integrated into a flexible structure, possibly covered with a thermally insulating outer sheath. Preferably, the first heating device extends from the first opening and over the entire fluid pipe 6*a*.

Advantageously, the second heating means 21, 22 comprise a second heating device 22 configured to heat at least the gas phase of the insulating fluid at the combination point 60 and in the downstream part of the first transfer circuit 6 connected to said combination point 60. Preferably, the second heating device 22 is arranged all around the combination point 60 and the first downstream part 6*b* of the first transfer circuit 6.

Preferably, the second heating device 22 is physically distinct from the first heating device 21 so as to be able to best adapt to the components to be heated in the area concerned.

Preferably, the second heating means may be configured to heat the surface of the transfer circuit 6 to temperatures ranging from 15 to 65° C., preferably from 30 to 55° C.

Advantageously, the second heating device 22 comprises a thermally insulating casing 22*a* defining an internal volume in which at least the downstream part of the first transfer circuit 6 and the combination point 60 are arranged. In addition, the second heating device 22 comprises a second heating member 22*b* adapted to heat said internal volume.

The use of a heated thermally insulating casing ensures more effective control of the temperature of the vaporized insulating fluid, simultaneously at the combination point and in the downstream part of the transfer circuit. The arrangement of the main distribution components in one and the same heated volume makes it possible to control the temperature more effectively and more simply than if the components were to be heated by independent heating systems.

Preferably, the second heating device 22 is of resistive type. It may comprise at least one electrical resistor arranged mounted on or near one of the walls of the insulating casing 22*a*. Heat transfer takes place by convection, preferably by forced convection. The second heating device 22 may be associated with an air circulation means 23 configured to circulate air from the second heating device 22 in the direction of the internal volume of the enclosure 2. This allows the entire internal volume of the insulating casing to be efficiently heated. In particular, the air circulation means 23 may comprise at least one fan. Preferably, the air circulation means 23 is configured to recover cold air from inside the insulating casing, preferably from a central region of the insulating casing, so that it is heated by the second heating device 22, and to eject the heated air. The air can circulate within the oven in a closed circuit, notably the circulated air is heated, circulates in the internal volume and then is drawn in by the circulation means so as to again be directed to the second heating device 22.

In particular, the second heating device 22 may be configured to heat the internal volume of the casing 22*a* to temperatures ranging from 15 to 65° C., preferably from 50 to 55° C. for perfluoroketone and preferably from 20 to 35° C. for perfluoronitrile.

Preferably, the thermally insulating casing 22*a* is a flexible casing. It can therefore contain components of complex shape that would be difficult to heat individually. In addition to the flow regulator(s), the transfer circuit may include various components, valves, conduits, fluid connectors, etc. The casing may be arranged around these various components while minimizing the internal volume so as not to heat it unnecessarily. The thermally insulating casing also has the advantage of stabilizing the operating temperature of the flow regulator devices so as to optimize the stability of these flows.

The casing may comprise at least one layer of a flexible material, such as at least one woven fabric of threads formed of a thermally insulating material, such as glass or Teflon threads, or a non-woven of fibers formed of a thermally insulating material such as glass or Teflon fibers. The term "fabric" means a manufactured product obtained by weaving threads, that is to say interlacing threads so as to obtain a woven fabric. The term "non-woven", or unwoven fabric, means a manufactured product formed of fibers arranged in a sheet, oriented randomly or directionally, and connected to one another by mechanical, chemical and/or thermal methods, excluding weaving. In particular, the non-woven may be formed of fibres connected by friction, cohesion or adhesion. The use of a fabric or a non-woven gives adequate flexibility to the casing.

In particular, the thermally insulating casing is a flexible double-walled casing comprising at least one heat-insulating material arranged between the walls. The walls help hold the heat-insulating material in place. They may each be formed from a layer of flexible material as described above. The heat-insulating material may include in particular glass, silicone, etc., for example in the form of wool or foam. According to an advantageous possibility, the thermally insulating casing is made up of several panels connected together by removable attachment means. Thus, the casing is modular and may adapt to the shapes and dimensions of the components of the installation. In particular, the dimensions of the casing may be modified according to the number of components of the gas mixture to be distributed. For example, panels may be added and the dimensions of the casing increased if the number of fluids to be used increases, since this leads to an increase in the number of transfer circuits and associated regulator devices.

The removable attachment means may comprise, for example, Velcro® type fasteners each comprising a hook component arranged on at least one panel and a complementary loop component arranged on another panel, a removable connection being formed by bringing the components into contact.

Advantageously, the second transfer circuit 7 comprises a second downstream part 7*b* connected to said combination point 60, which downstream part preferably comprises a second flow regulator device 13 connected on the one hand to the second vessel 2 and on the other hand to the combination point 60. The second flow regulator device 13 is configured to regulate and/or adjust the flow rate of carrier fluid flowing toward the combination point 60 according to a second flow setpoint D2 which may be determined as a function of a target content C2 of carrier fluid in the mixture.

The second heating device 22 is configured to heat the second downstream part of the second transfer circuit 7. It is thus possible to also control the temperature of the second flow regulator device 13 and be free from the effects of external influences, which allows on-site distribution of a gas mixture with great precision. In particular, the second downstream part of the second transfer circuit 7 is arranged in the internal volume defined by the insulating casing 22*a*.

In the case where the installation comprises one or more additional carrier fluid vessels 3, 4, each of these additional vessels may be connected to the combination point 60 or a connection point 70 located downstream of the combination point 60, as shown for example in FIG. 2. Preferably, each additional carrier fluid is transferred in the gaseous state from its vessel by a respective additional transfer circuit comprising a downstream part provided with additional flow regulator devices 18, 19.

The flow regulator devices make it possible to regulate the flow rate of each additional carrier fluid according to a third flow setpoint D3 and a fourth flow setpoint D4, respectively. Downstream of the combination point 60, or of the connection point 70 where applicable, a mixture of the gas phases of each fluid is obtained with a total flow rate which corresponds to the sum of the flow rates of each fluid. Controlling the flow rates therefore makes it possible to control the concentration of each of the fluids constituting the gas mixture produced.

Preferably, the additional downstream part of the additional transfer circuit comprising the additional flow regulator device(s) 18, 19 is also heated by the second heating device 22, so as to stabilize operation thereof, as explained above.

Advantageously, all of the downstream parts of the fluid transfer circuits of the installation comprising flow regulator devices are heated by the second heating device 22. In particular, all of these systems are arranged in the internal volume defined by the insulating casing 22*a*. The fluid regulation and distribution components are thus heated simultaneously up to the combination point.

Note that in the context of the invention, the flow regulator members may be any means configured to set, regulate or adjust the flow rate of a fluid in order to bring it to a flow value closest to the desired value. Typically, the flow regulator members each comprise a flow sensor, or flow meter, combined with an expansion member, such as a valve, for example a proportional control valve. The valve may be pneumatic or piezoelectric, analogue or digital. The valve comprises a moving part, typically at least one closure member, which is placed in the flow of fluid and the movement of which makes it possible to vary the passage cross section, and thus to vary the flow in order to bring it to the setpoint value. In particular, the flow regulator members may be mass flow regulators comprising a mass flow sensor and a proportional control valve.

Advantageously, the first heating means 10 are configured to heat the liquefied insulating fluid in the first vessel 1 to a first temperature, the second heating means being configured to heat the vapor phase of the liquefied insulating fluid to a second temperature higher than the first temperature at least at the combination point 60 and in the downstream part of the first transfer circuit 6. This prevents any risk of recondensation of the vapor phase downstream of the first vessel 1.

Preferably, the installation according to the invention may comprise one or more of the regulation modes described below.

According to a first aspect, the first heating means 10 are configured to deliver a variable heating power. It is thus possible to adjust the temperature for heating the liquefied insulating fluid in the first vessel 1. Preferably, the installation further comprises at least one pressure sensor PC configured to measure the pressure prevailing inside the first vessel 1. The sensor PC may be internal or external to the vessel and/or be connected to the vessel 1 or to a pipeline connected to the vessel 1. A first control unit 41 is connected to the pressure sensor PC and to the first heating means 10. The first control unit 41 is configured to vary the heating power delivered by the first heating means 10 on the basis of the pressure measured by the pressure sensor PC.

The heating power is thus adapted to adjust the temperature to which the insulating fluid is heated in the first vessel 1 in order to stabilize the pressure in the vessel 1. In the event of variation, the control unit adapts the heating conditions by way of the first means 10 so as to adjust the pressure in the vessel. A continuous distribution with a stable gas phase flow rate is thus ensured. This mode of regulation is more effective and safer than an independent regulation of the first heating means, since a variation in pressure has a direct and immediate impact on the state of the physical system in the vessel 1. Regulating the heating by measuring pressure makes it possible to obtain a very stable temperature of the insulating fluid in the first vessel 1.

This embodiment is particularly suitable for the case where the insulating fluid is distributed in pure form, since the pressure in the vessel 1 corresponds to the gas phase pressure and directly reflects the quantity of insulating fluid that can be vaporized.

Preferably, the first control unit 41 comprises means for comparing the pressure in the first vessel 1 with a first set pressure, the first control unit 41 being configured to reduce the heating power when the pressure measured inside the vessel 1 is greater than or equal to the first set pressure and to increase the heating power when the pressure in the vessel 1 is lower than the first set pressure. Note that the reduction in the heating power is understood to mean heating with a lower power or stoppage of the heating, as a function of the pressure difference calculated by the control unit 41 between the pressure setpoint and the measured pressure of the system.

The regulation applied to the heating power of the first heating means as a function of the pressure makes it possible to distribute an optimal flow of insulating fluid while avoiding unnecessarily overheating the first vessel 1.

According to a variant (not shown), it is conceivable to replace the pressure sensor PC with a temperature measurement member configured to measure the temperature of at least a portion of the outer surface of a wall of the vessel 1, i.e. the skin temperature of the vessel 1. Heating of the first heating means 10 is thus regulated as a function of this temperature. The temperature measurement member may be any member configured to take temperature measurements by contact, in particular a resistance temperature sensor, for example a PT100 platinum resistance sensor, or a thermocouple or thermistor temperature probe.

The first control unit 41 is connected to the temperature measurement member and to the first heating means 10. The first control unit 41 is configured to vary the heating power delivered by the first heating means 10 as a function of the temperature measured.

Advantageously, the first control unit 41 comprises means for comparing the temperature measured by the temperature measurement member with a first set temperature of predetermined value. The control unit 41 is configured to reduce the heating power when the temperature measured is greater than the first set temperature and to increase the heating power when the temperature measured is lower than the first set temperature. Note that the reduction in the heating power is understood to mean heating with a lower power or stoppage of the heating, as a function of the pressure difference calculated by the control unit 41 between the temperature setpoint and the measured temperature of the system.

According to a second aspect, the second heating means are configured to deliver a variable heating power. It is thus possible to adjust the temperature for heating the liquefied insulating fluid vapors in the transfer circuit 6 and at the combination point 60. Preferably, the heating power of the second heating means may be adjusted and/or regulated on the basis of a measurement of the temperature in the first heating device 21 and/or second heating device 22. The first heating device 21 and/or the second heating device 22 may thus have one or more temperature sensors TC. Note that it is also conceivable to position temperature sensors TC in other areas, in particular in the internal volume heated by the second heating device 22.

A third control unit 43 is connected to the temperature sensor(s) TC and to the second heating means. The third control unit 41 is configured to vary the heating power delivered by the second heating means on the basis of the temperature measured by the temperature sensor TC. The heating power may thus be adjusted to vary the temperature to which the insulating fluid is heated in the first transfer circuit 6 and at the combination point 60. FIG. 1 schematically depicts a common control of the heating power of the first heating device 21 and the second heating device 22. It is also possible to independently control the heating power of the first heating device 21 and the second heating device 22.

The third control unit 43 comprises means for comparing the temperature measured by at least one temperature sensor with at least one second set temperature. The third control unit 43 is configured to reduce the heating power when the temperature measured is greater than or equal to the second set temperature and to increase the heating power when the temperature measured is lower than the second set temperature. Note that the heating power of the first heating device 21 and the heating power of the second heating device 22 may be regulated according to the same set temperature or according to different set temperatures.

Advantageously, the third control unit 43 comprises a first control loop for regulating the heating power of the second heating means according to the second set temperature. The control loop regularly determines the difference between the temperature measured and the second set temperature that it is desired to maintain, and calculates the appropriate command to be applied to one or more actuators so as to reduce this difference as quickly as possible. The control loop operates in a closed loop.

Preferably, the first control loop comprises a first comparator configured to produce at least a first error signal obtained by comparison between a measured temperature and the second set temperature. The first loop comprises a first corrector configured to produce a first control signal from the first error signal and to send said control signal to actuators which command an adjustment, in response to the first control signal, of the power of the second heating means. Preferably, the first corrector is of proportional, integral and derivative (PID) type.

According to a third aspect, in the case where the installation comprises third heating means 30 configured to heat the liquefied carrier fluid in the second vessel 2, said third means 30 may be configured to deliver a variable heating power. It is thus possible to adjust the temperature for heating the liquefied insulating fluid in the second vessel 2. Preferably, the installation further comprises at least another pressure sensor PC configured to measure the pressure prevailing inside the first vessel 2. The sensor PC may be internal or external to the vessel and/or be connected to the vessel 2 or to a pipeline connected to the vessel 2. FIG. 1 shows the first control unit 41 connected to the other pressure sensor PC and to the third heating means 30. The first control unit 41 is configured to vary the heating power delivered by the means 30 on the basis of the pressure measured by the other sensor PC. Heating of the second vessel 2 may also be regulated by an independent control unit. Note that all or some of the features and advantages described in connection with the first heating means are applicable to the regulation of the third heating means.

According to a variant (not shown), regulation of the heating of the means 30 by measuring pressure as described above may be replaced by regulation by measuring the external temperature of the second vessel 2, i.e. the skin temperature of the second vessel 2. Note that all or some of the features described for the regulation of the first heating means by measuring temperature are applicable to this mode of regulation of the third heating means.

According to a fourth aspect, the installation comprises a second control unit 42 which is connected to the first and second flow regulator devices, 61 and 13 respectively, so as to control their operation in accordance with the desired flow setpoints D1 and D2. The two flow regulator devices 61 and 13 advantageously comprise a closed loop system which receives the flow setpoints D1 and D2 from the control unit 42. The flow regulator devices 61 and 13 each include at least one flow sensor that measures the fluid flow rate. The closed loop system compares the flow rates measured with the respective flow setpoints. The positions of the devices are adjusted by said system accordingly to keep the flow rates toward the combination point 60 as close as possible to D1 and D2. Preferably, the flow control loop is of PID type.

Advantageously, the control unit(s) 41, 42, 43 comprise a programmable controller, also referred to as a PLC (Programmable Logic Controller) system, i.e. a control system for an industrial process comprising a human-machine interface for supervision and a digital communication network. The control unit(s) 41, 42, 43 may thus comprise at least one of the following: a microcontroller, a microprocessor, a computer. The control unit(s) 41, 42, 43 may be connected to the various pieces of control equipment of the installation, in particular to the flow regulator members, sensors, and communicate with said pieces of equipment by electrical, Ethernet, Modbus, etc. connections and/or by radiofrequency, WIFI, Bluetooth, etc. connections. Optionally, the control units 41, 42, 43 may form the same entity.

As can be seen in FIG. 1, the second transfer circuit 7 may comprise at least one expansion member 5 configured to reduce the pressure of the gas phase of the carrier fluid. This allows operation of the second flow regulator device 13 at a pressure acceptable to the latter. Preferably, a heater 11 is arranged upstream of the expansion member 5 so as to heat the gas phase before its expansion by the expansion member 5. This helps compensate for the cooling caused by the Joule-Thomson effect during the adiabatic expansion of the gas. Note that two expansion members may optionally be arranged in series, optionally with another heater arranged between two expansion members. At least one heater and at least one pressure reducer may also be arranged on the additional transfer circuits, where applicable.

The distribution circuit 8 advantageously comprises a mixing device 50 configured to mix and homogenize the gas phase of the insulating fluid and the gas phase of the carrier fluid combined upstream. Use could for example be made of a mixer of static mixer type enabling continuous mixing of the fluids entering the mixer. This type of mixer generally comprises at least one disrupting element, such as a plate, a portion of pipe, an insert, capable of disrupting the flow of the fluids, and of generating a flow which is turbulent and no longer laminar, in order to promote the mixing of the fluids and the homogenization thereof.

According to a variant shown in FIG. 2, the mixing device 50 may optionally comprise two separate mixing members 51, 52. Thus, combination of the gas phases of the insulating fluid and the carrier fluid first takes place at the combination point 60. An intermediate mixture of these phases is produced at the outlet of the first mixing member 51. The carrier fluid from the vessel 3 is combined with the intermediate mixture at the connection point 70 and is then mixed with the intermediate mixture in the second mixing member 52. Thus, the additional carrier fluid is only combined with the insulating fluid when the latter has already been diluted with the carrier fluid, which improves the safety of the installation when the carrier fluid is oxygen.

At the outlet of the mixing device 50, the insulating gas mixture may have a first pressure ranging from 2.5 to 1 bar absolute.

Preferably, a pressure-raising member 53, such as a compressor with one or more stages, is arranged downstream of the mixing device 50. Thus, once the gas mixture has been produced with the desired composition, its pressure is raised to the filling pressure of the electrical system. Typically, the mixture may have a second pressure ranging from 2.5 to 11 bar absolute at the outlet of the pressure-raising member 53.

The distribution circuit 8 may comprise a buffer tank 12 arranged upstream of the pressure-raising member 53. This makes it possible to smooth out any fluctuations in flow rate before increasing the pressure of the fluid. The buffer tank 12 also makes it possible to complete the homogenization of the mixture. The buffer tank 12 may be formed of a single tank or of several tanks fluidically connected to one another.

The distribution circuit 8 may comprise a branch off to a gas mixture discharge and/or reprocessing point 91. This makes it possible to purge the fluid circuit, for example after a filling sequence and before the start of the next sequence. The installation may further comprise a mixture sampling point 92 intended to be connected to an analysis unit configured to analyze at least one content of the insulating fluid and/or the carrier fluid in the mixture distributed. This makes it possible, upon start-up of the installation or during a filling sequence, to check that the gas mixture complies with the target contents. If the mixture produced does not comply, distribution may optionally be stopped. The distribution circuit 8 may include automatic switching means to selectively supply the distribution point 90, the discharge point 91 or the sampling point 92.

The installation according to the invention makes it possible to distribute a gaseous dielectric mixture with improved stability and precision in terms of production. The composition of the mixture may be easily adapted to the required specifications. The gas mixture may contain at least one insulating fluid usually used for gas insulation of high-voltage electrical systems. As a reminder, the insulating gas mixture contains a carrier fluid and optionally at least one additional carrier fluid.

Preferably, said insulating gas mixture has a GWP equal to or less than 1000, that is to say at most 1000 times higher than that of $CO_2$, or even less than or equal to 500. A carrier fluid and at least one optional additional carrier fluid may be used in a mixture with the insulating fluid. Typically, the gas mixture may comprise from 2 to 15% (molar %) of insulating fluid, from 65 to 98% of carrier fluid, and from 3 to 20% of at least one optional additional carrier fluid such as oxygen.

Take the example of an installation configured to produce a mixture of three gases with a distribution flow rate of 100 sL/min. The desired gas mixture is a mixture formed of perfluoronitrile as insulating fluid with a target content C1 of 5% (molar %), $CO_2$ as carrier fluid with a content C2 of 85%, and 10% oxygen as additional carrier fluid. A first flow setpoint D1 of 5 sL/min, a second setpoint D2 of 85 sL/min, and a third flow setpoint D3 of 10 sL/m are applied to the respective flow regulator devices.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An installation for distributing an electrically insulating gas mixture to a gas insulated electrical system, in particular a high-voltage electrical system, said installation comprising:

a first vessel (1) intended to contain an insulating fluid in the liquid or liquefied state, a first heater (10) configured to heat the insulating fluid in the first vessel (1) such that said first vessel (1) produces, at a first outlet, a gas phase of the insulating fluid, a second vessel (2) intended to contain a carrier fluid and configured to produce a gas phase of the carrier fluid at a second outlet of the second vessel (2), a first transfer circuit (6) configured to transfer the gas phase of the insulating fluid from the first outlet of the first vessel (1) to a combination point (60), the first transfer circuit (6) comprising a first upstream part (6*a*) connected to the first vessel (1) and a first downstream part (6*b*) connected on the one hand to the first upstream part (6*a*) and on the other hand to the combination point (60), a second transfer circuit (7) configured to transfer the gas phase of the carrier fluid from the second outlet of the second vessel (2) to the combination point (60), a distribution circuit (8) fluidically connected to the combination point (60) and configured to distribute an electrically insulating gas mixture comprising the gas phase of the insulating fluid and the gas phase of the carrier fluid to the electrical system, the first downstream part (6*b*) of the first transfer circuit (6) comprising a first flow regulator device (61) configured to regulate and/or adjust the gas phase flow rate of the gas phase of the insulating fluid flowing toward the combination point (60), said installation further comprising a second heater (21, 22) configured to heat the gas phase of the insulating fluid at least at the combination point (60) and in the downstream part (6*b*) of the first transfer circuit (6).

2. The installation of claim 1, characterized in that the second heater (21, 22) is further configured to heat the gas phase of the insulating fluid in at least a portion of the first upstream part (6*a*) of the first transfer circuit (6).

3. The installation of claim 1, characterized in that the first upstream part (6*a*) of the transfer circuit (6) comprises at least one fluid pipe (6*a*), the second heater (21, 22) comprising a first resistive or inductive heating device (21) arranged around all or part of said fluid pipe (6*a*).

4. The installation of claim 3, characterized in that the second heater (21, 22) comprises a second heating device (22) arranged around the combination point (60) and the first downstream part (6*b*) of the first transfer circuit (6).

5. The installation of claim 4, characterized in that the second heater (22) comprises a thermally insulating casing (22*a*) defining an internal volume in which the downstream part of the first transfer circuit (6), the first flow regulator device (61), and the combination point (60) are arranged, and a heating member (22*b*) adapted to heat said internal volume.

6. The installation of claim 5, characterized in that the thermally insulating casing (22*a*) comprises at least one layer of a flexible material comprising at least one woven fabric of threads formed of a thermally insulating material or a non-woven of fibers formed of a thermally insulating material.

7. The installation as claimed in claim 5, characterized in that the thermally insulating casing is made up of several panels connected together by removable attachments.

8. The installation of claim 1, characterized in that the second transfer circuit (7) comprises a second upstream part (7*a*) connected to the second vessel (2) and a second downstream part (7*b*) connected to the combination point (60), said second downstream part (7*b*) comprising a second flow regulator device (13) configured to regulate and/or adjust the gas phase flow rate of the carrier fluid flowing toward the combination point (60), the second heater (22) configured to heat the second downstream part (7*b*) of the second transfer circuit (7).

9. The installation of claim 1, further comprising at least one additional vessel (3, 4) intended to contain an additional carrier fluid and configured to produce a gas phase of said additional carrier fluid at an outlet of the additional vessel (3, 4), the installation comprising an additional transfer circuit configured to transfer the gas phase of the additional carrier fluid from the outlet of the additional vessel (3, 4) to the combination point (60), the additional transfer circuit comprising an additional upstream part connected to the additional vessel (3, 4) and an additional downstream part connected to the combination point (60), said additional downstream part comprising an additional flow regulator device (18, 19) configured to regulate and/or adjust the gas phase flow rate of the additional carrier fluid flowing toward the combination point (60), the second heater (22) configured to heat the additional downstream part of the additional transfer circuit.

10. The installation of claim 1, characterized in that the first heater (10) is configured to heat the liquid or liquefied insulating fluid in the first vessel (1) to a first temperature, the second heater (21, 22) being configured to heat the vapor phase of the liquid or liquefied insulating fluid to a second temperature higher than the first temperature at least at the combination point (60) and in all or part of the first transfer circuit (6).

11. The installation of claim 1, characterized in that the first heater (10) is configured to deliver a variable heating power, the installation comprising at least one pressure sensor (PC) configured to measure the pressure prevailing inside the first vessel (1) and a first control unit (41) connected to the pressure sensor (PC) and to the first heating heater (10), the first control unit (41) being configured to vary the heating power delivered by the first heater (10) as a function of the pressure measured by the pressure sensor (PC).

12. The installation claim 1, characterized in that the first heater (10) is configured to deliver a variable heating power, the installation comprising at least one temperature measurement member configured to measure the temperature of the first vessel (1) and a first control unit (41) connected to the temperature measurement member and to the first heater (10), the first control unit (41) being configured to vary the heating power delivered by the first heater (10) as a function of the temperature measured by the temperature measurement member.

13. The installation claim 1, characterized in that the second vessel (2) is configured to contain the carrier fluid in liquefied form, the installation comprising a third heater (30) configured to heat the liquefied carrier fluid in the second vessel (2) in such a way as to vaporize at least part of the liquefied carrier fluid and to distribute a gas phase of the carrier fluid in the second transfer circuit (7).

14. The installation of claim 13, characterized in that the second transfer circuit (7) comprises an expansion member (5) configured to reduce the pressure of the gas phase of the carrier fluid, a heater (11) arranged upstream of the expansion member (5) so as to heat the gas phase before its expansion by the expansion member (5).

15. The installation of claim 1, characterized in that the distribution circuit (8) comprises at least one of the following: a mixing device (50) configured to mix the gas phase of the insulating fluid and the gas phase of the carrier fluid, a pressure-raising member (53) arranged downstream of the mixing device (50), and a buffer tank (12) arranged upstream of the pressure-raising member (53).

16. A method for distributing an electrically insulating gas mixture to a high-voltage electrical system, said method comprising the following steps:

a) heating an insulating fluid in the liquid or liquefied state in a first vessel (1) by first heater (10) so as to vaporize at least part of the liquefied insulating fluid and to produce a gas phase of the insulating fluid in the first vessel (1), b) passing the gas phase of the insulating fluid through a first transfer circuit (6) so as to transfer the gas phase of the insulating fluid from the first vessel (1) to a combination point (60), the first transfer circuit (6) comprising a first upstream part (6*a*) connected to the first vessel (1) and a first downstream part (6*b*) connected on the one hand to the first upstream part (6*a*) and on the other hand to the combination point (60), c) regulating and/or adjusting the gas phase flow rate of the insulating fluid flowing toward the combination point (60) by means of a first flow regulator device (61) arranged on the first downstream part of the first transfer circuit (6), d) passing a gas phase of a carrier fluid from a second vessel (2) through a second transfer circuit (7) so as to transfer the gas phase of the carrier fluid to the combination point (60), e) combining the gas phase of the insulating fluid and the gas phase of the carrier fluid at the combination point (60) and passing the gas phase of the insulating fluid and the gas phase of the carrier fluid combined through a distribution circuit (8) adapted to distribute to the high-voltage electrical system an electrically insulating gas mixture comprising the gas phase of the insulating fluid and the gas phase of the carrier fluid, f) heating the gas phase of the insulating fluid at least at the combination point (60) and in the downstream part (6*b*) of the first transfer circuit (6).

* * * * *